(12) United States Patent
Lee et al.

(10) Patent No.: US 8,471,982 B2
(45) Date of Patent: Jun. 25, 2013

(54) SYSTEM FOR DISPLAY IMAGES

(75) Inventors: Hao-Chun Lee, Taitung (TW);
Wei-Chuan Huang, Hengshan Township (TW)

(73) Assignee: TPO Displays Corp., Chu-Nan (TW)

( * ) Notice: Subject to any disclaimer, the term of this patent is extended or adjusted under 35 U.S.C. 154(b) by 617 days.

(21) Appl. No.: 12/651,978

(22) Filed: Jan. 4, 2010

(65) Prior Publication Data

US 2010/0171894 A1 Jul. 8, 2010

Related U.S. Application Data (60) Provisional application No. 61/204,383, filed on Jan. 5, 2009.

(30) Foreign Application Priority Data

Sep. 16, 2009 (TW) ................................ 98131193 A (51) Int. Cl.
*G02F 1/1333* (2006.01)
(52) U.S. Cl.
USPC ........................................................... 349/84

(58) Field of Classification Search
USPC ............................................................ 349/84
See application file for complete search history.

(56) References Cited

U.S. PATENT DOCUMENTS

| | | | | |
|---|---|---|---|---|
| 6,549,257 B2 * | 4/2003 | Liu | ................................ | 349/129 |
| 6,900,869 B1 * | 5/2005 | Lee et al. | ....................... | 349/129 |
| 7,969,535 B2 * | 6/2011 | Chiu et al. | ..................... | 349/104 |
| 2009/0262291 A1 * | 10/2009 | Scheffer et al. | ............... | 349/123 |
| 2011/0019136 A1 * | 1/2011 | Ogawa et al. | .................. | 349/113 |

* cited by examiner

*Primary Examiner* — Timothy L Rude
(74) *Attorney, Agent, or Firm* — Liu & Liu (57) ABSTRACT

A system for displaying images including a liquid crystal display panel is provided. The liquid crystal display panel includes a first substrate having at least one sub-pixel, a first transparent electrode layer disposed over the first substrate in the sub-pixel, a second substrate having an inner surface corresponding to the first substrate, a second transparent electrode layer disposed over the inner surface corresponding to the sub-pixel, wherein the second transparent electrode layer has only one pattern thereon, and a liquid crystal layer disposed between the first and the second substrates. The liquid crystal layer includes a plurality of liquid crystal molecules and the liquid crystal molecules are orthogonal to the first and the second substrates.

5 Claims, 7 Drawing Sheets

SYSTEM FOR DISPLAY IMAGES

CROSS REFERENCE TO RELATED APPLICATIONS

This application claims the benefit of U.S. Provisional Application No. 61/204,383, filed on Jan. 5, 2009, and priority of Taiwan Patent Application No. 098131193, filed on Sep. 16, 2009, the entirety of which are incorporated by reference herein.

BACKGROUND OF THE INVENTION

1. Field of the Invention

The invention relates to a system for displaying images including a liquid crystal display panel, and more particularly to an electrode structure designed for a vertically aligned liquid crystal display panel.

2. Description of the Related Art

Vertically aligned liquid crystal displays (VA-LCDs) are liquid crystal displays with a high contrast ratio and a wide viewing angle. In general, one sub-pixel of the conventional vertically aligned liquid crystal displays is further divided into two or three smaller sub-pixel areas to make one sub-pixel thereof have two or three multi-domain areas. Thus, the conventional vertically aligned liquid crystal displays can have stabile and symmetrical multi-domain areas. In the conventional vertically aligned liquid crystal displays, a patterned transparent electrode layer made of indium tin oxide (ITO) on an array substrate or another patterned transparent electrode layer made of ITO on a color filter substrate is formed to achieve the multi-domain areas due to the patterns of the transparent electrode layers.

Figure 1A:
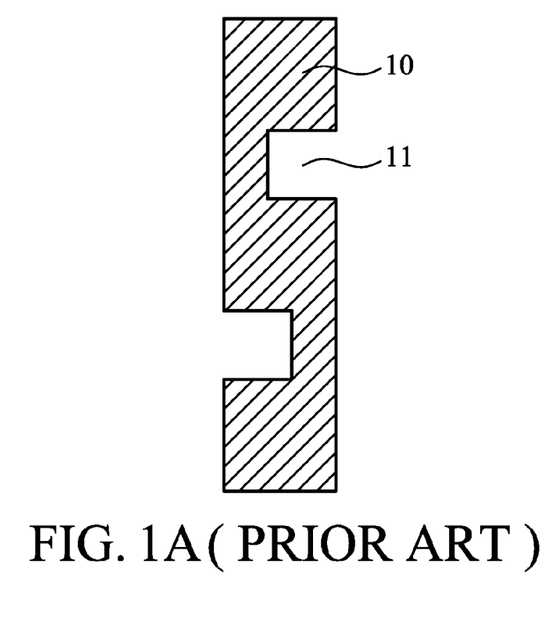
FIG. 1A shows a schematic plane view of a transparent electrode layer of an array substrate in a sub-pixel of a conventional vertically aligned liquid crystal display (VA-LCD)
Figure 1B:
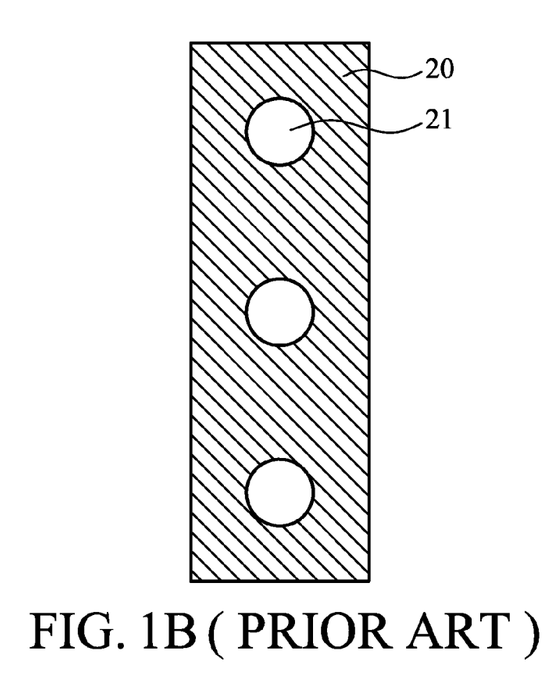
FIG. 1B shows a schematic plane view of a transparent electrode layer of a color filter substrate in a sub-pixel of a conventional vertically aligned liquid crystal display (VA-LCD)

Referring to FIG. 1A, a plane view of a transparent electrode layer 10 of an array substrate in one sub-pixel of a conventional vertically aligned liquid crystal display is shown. The transparent electrode layer 10 disposed on the array substrate (not shown) in one sub-pixel has two slits 11. Next, referring to FIG. 1B, a plane view of a transparent electrode layer 20 of a color filter substrate in one sub-pixel of the conventional vertically aligned liquid crystal display is shown. The transparent electrode layer 20 disposed on the color filter substrate (not shown) in one sub-pixel has three openings 21.

Figure 1C:
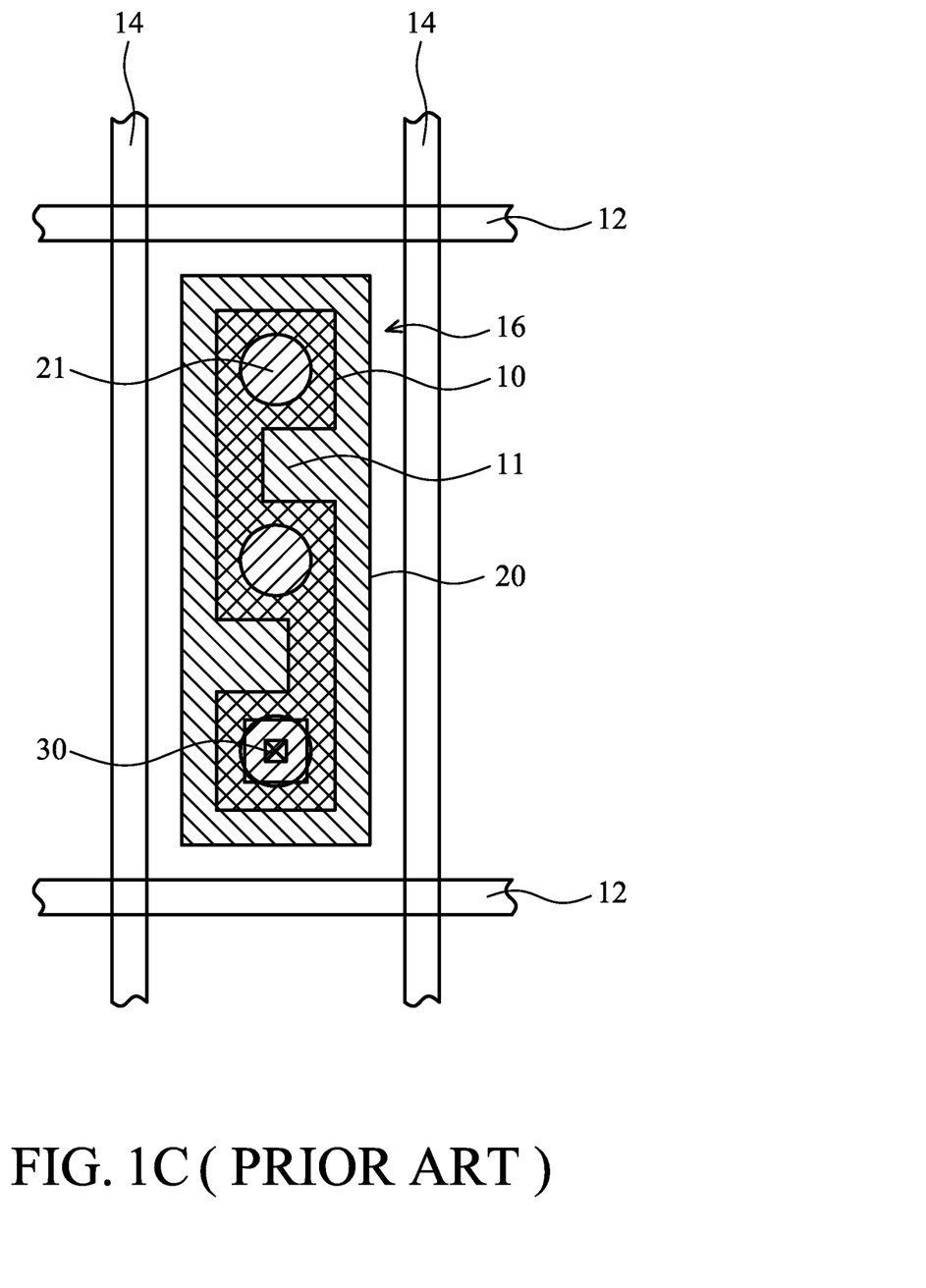
FIG. 1C shows a schematic plane view of a transparent electrode layer of an array substrate overlapping with a transparent electrode layer of a color filter substrate in a sub-pixel of a conventional vertically aligned liquid crystal display (VA-LCD)

Then, referring to FIG. 1C, a plane view of the transparent electrode layer 10 of the array substrate overlapping with the transparent electrode layer 20 of the color filter substrate in one sub-pixel of the conventional vertically aligned liquid crystal display is shown. The sub-pixel 16 is defined by two adjacent scan lines 12 and two adjacent data lines 14. The slits 11 of the transparent electrode layer 10 of the array substrate are arranged to correspond with the openings 21 of the transparent electrode layer 20 of the color filter substrate, such that one sub-pixel 16 can be divided into three multi-domain areas. A contact hole 30 is disposed at an area corresponding to one opening of the transparent electrode layer 20 of the color filter substrate. The response rate of the conventional vertically aligned liquid crystal display can be enhanced by increasing a width of the slits 11 of the transparent electrode layer 10 of the array substrate and/or increasing a size of the openings 21 of the transparent electrode layer 20 of the color filter substrate. However, the width of the slit 11 of the transparent electrode layer 10 of the array substrate and the size of the opening 21 of the transparent electrode layer 20 of the color filter substrate are large. Thus, push mura, produced by touching the touch panel, is a serious problem for vertically aligned liquid crystal display panels applied as touch panels.

Besides, for the vertically aligned liquid crystal display, while the width of the slit 11 of the transparent electrode layer 10 of the array substrate and the size of the opening 21 of the transparent electrode layer 20 of the color filter substrate are larger, transmission is reduced and driving voltage is increased.

Therefore, a vertically aligned liquid crystal display that has enhanced response rate thereof, reduced push mura of the touch panel, increased transmission and reduced driving voltage thereof is desired.

BRIEF SUMMARY OF THE INVENTION

An embodiment of the invention provides a system for displaying images including a liquid crystal display panel. The liquid crystal display panel comprises a first substrate, having a plurality of orthogonal data lines and scan lines thereon, wherein the two adjacent data lines and the two adjacent scan lines define a sub-pixel. A first transparent electrode layer is disposed over the first substrate and in the sub-pixel. A second substrate is disposed opposite to the first substrate, having an inner surface, and a second transparent electrode layer is disposed over the inner surface of the second substrate, corresponding to the sub-pixel, wherein the second transparent electrode layer in the sub-pixel has only one pattern therein. Moreover, a liquid crystal layer is disposed between the first substrate and the second substrate, wherein the liquid crystal layer has a plurality of liquid crystal molecules therein and the liquid crystal molecules are orthogonal to the first substrate and the second substrate.

A detailed description is given in the following embodiments with reference to the accompanying drawings.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. The description is provided for illustrating the general principles of the invention and is not meant to be limiting. The scope of the invention is best determined by reference to the appended claims.

In an embodiment of the invention, an electrode structure designed for a vertically aligned liquid crystal display is provided to enhance the response rate thereof, reduce push mura of a touch panel thereof, increase light transmission and reduce driving voltage of the vertically aligned liquid crystal display. Moreover, the embodiment of the invention can also be applied to multi-domain vertically aligned liquid crystal displays (MVA-LCDs).

Figure 2A:
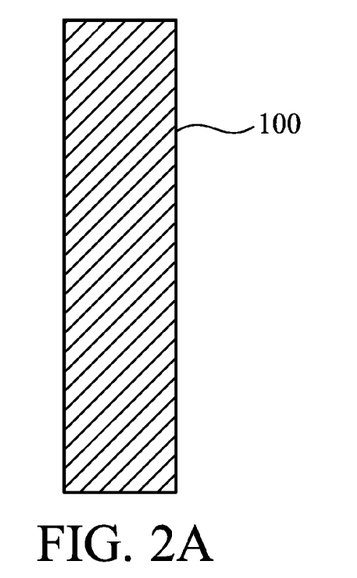
FIG. 2A shows a schematic plane view of a transparent electrode layer of an array substrate in a sub-pixel of a vertically aligned liquid crystal display (VA-LCD) according to an embodiment of the invention.

Referring to FIG. 2A, a plane view of a transparent electrode layer of an array substrate in one sub-pixel of a vertically aligned liquid crystal display (VA-LCD) according to an embodiment of the invention is shown. In one sub-pixel, the transparent electrode layer 100 of the array substrate is a plane structure, i.e. there is no pattern such as an opening, a slit or a protrusion in the transparent electrode layer 100. Next, referring to FIG. 2B, a plane view of a transparent electrode layer of a color filter substrate in one sub-pixel of a vertically aligned liquid crystal display (VA-LCD) according to an embodiment of the invention is shown. In one sub-pixel, the transparent electrode layer 200 of the color filter substrate has only one pattern therein, for example only one opening 202 or only one protrusion 202 is presented in the transparent electrode layer 200. The protrusion 202 may be formed from a photosensitive resin material. The transparent electrode layer 100 of the array substrate and the transparent electrode layer 200 of the color filter substrate may be formed from indium tin oxide (ITO) or indium zinc oxide (IZO).

Figure 2B:
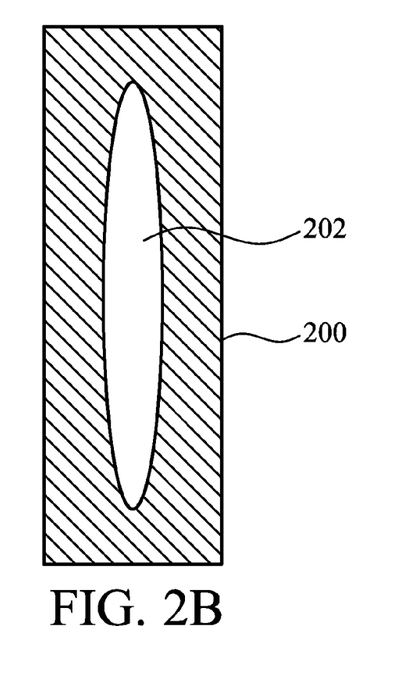
FIG. 2B shows a schematic plane view of a transparent electrode layer of a color filter substrate in a sub-pixel of a vertically aligned liquid crystal display (VA-LCD) according to an embodiment of the invention.
Figure 2C:
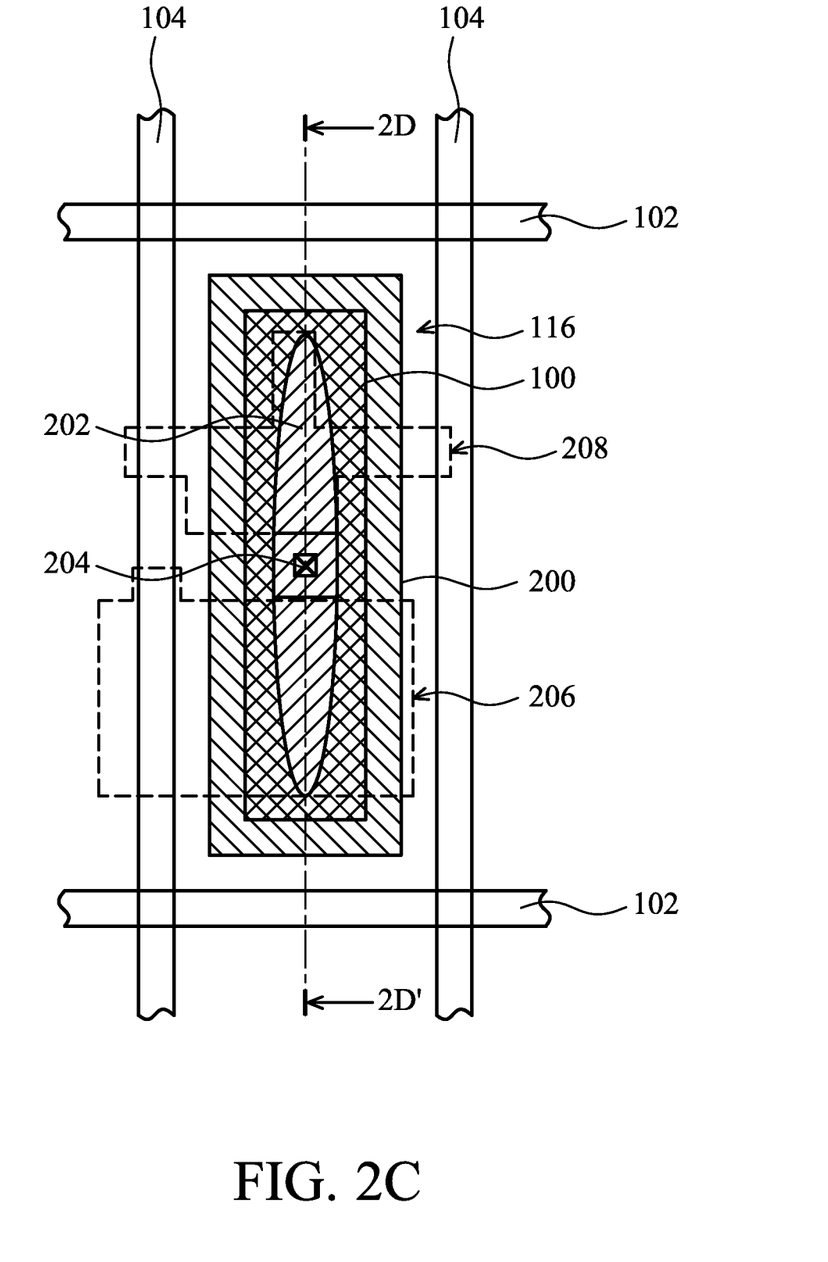
FIG. 2C shows a schematic plane view of a transparent electrode layer of an array substrate overlapping with a transparent electrode layer of a color filter substrate in a sub-pixel of a vertically aligned liquid crystal display (VA-LCD) according to an embodiment of the invention.

Referring to FIG. 2C, a plane view of the transparent electrode layer 100 of the array substrate overlapping with the transparent electrode layer 200 of the color filter substrate in one sub-pixel of the vertically aligned liquid crystal display (VA-LCD) according to an embodiment of the invention is shown. A sub-pixel 116 is defined by any two adjacent scan lines 102 and any two adjacent data lines 104. The sub-pixel 116 may be a red, a green or a blue sub-pixel. In an embodiment of the invention, the transparent electrode layer 100 of the array substrate is a plane structure and the transparent electrode layer 200 of the color filter substrate has only one opening or one protrusion, such that only one multi-domain area is formed in one sub-pixel of the display panel. Accordingly, driving voltage of the VA-LCD of the invention is reduced and power consumption thereof is also reduced. Moreover, in an embodiment of the invention, the opening or the protrusion of the transparent electrode layer 200 of the color filter substrate can further control liquid crystal molecules of the display panel, such that response rate of the display is enhanced. In addition, according to an embodiment of the invention, when the electrode structure design of the VA-LCD of the invention is applied to touch panels, push mura in the touch panels during touching of the touch panels is reduced. Furthermore, the electrode structure of the display panel of the invention is simple, thus the fabrication process of the display panel of the invention is simplified and the fabrication costs thereof is reduced when compared to conventional methods.

As shown in FIG. 2C, in an embodiment of the VA-LCD of the invention, a contact hole 204, a storage capacitor (Cst) 206, a thin-film transistor (TFT) 208 and other light shielding elements (not shown) are disposed to overlap with the opening 202 of the transparent electrode layer 200 of the color filter substrate, such that the transmission of the display is enhanced. The other light shielding elements are elements such as photosensitive spacers and a light shielding layer, for example a metal layer or a black matrix, corresponding to the photosensitive spacers. In addition, the layout of the scan lines also can be disposed to overlap with the opening 202 to enhance light transmission of the display.

Figure 2D:
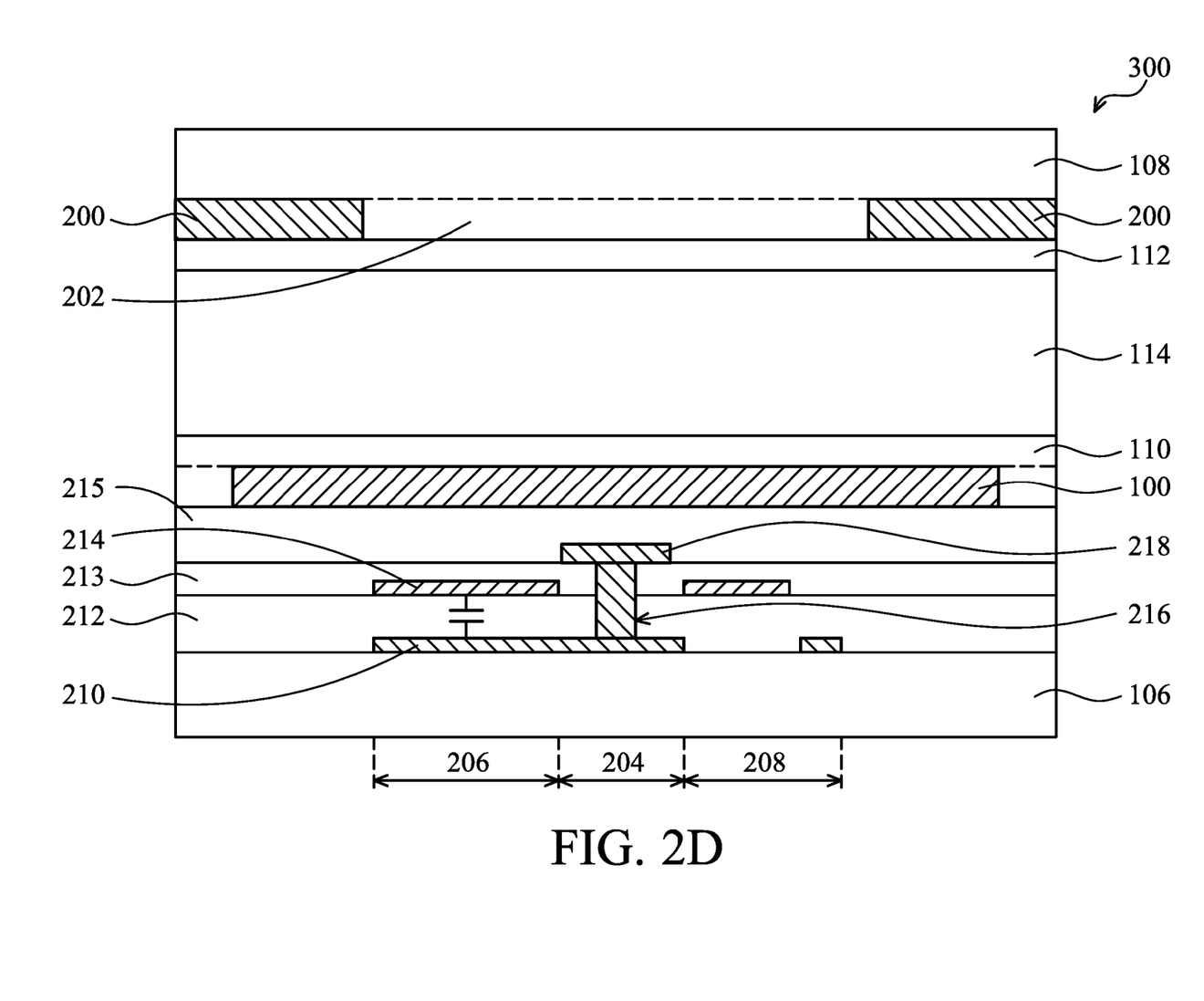
FIG. 2D shows a schematic cross section along the line 2D-2D' of the display panel of FIG. 2C according to an embodiment of the invention.

Next, referring to FIG. 2D, a cross section along the line 2D-2D' of the liquid crystal display panel 300 of FIG. 2C according to an embodiment of the invention is shown. A first substrate 106 such as the array substrate has a plurality of orthogonal data lines and scan lines (not shown) thereon. Then, a semiconductor layer 210, an insulating layer 212 and a first conductive layer 214 are formed in sequence on the array substrate 106 to form the storage capacitor 206 and the TFT 208. Next, an insulating layer 213 is formed on the first conductive layer 214 and a hole 216 is formed in the insulating layers 212 and 213 to expose the semiconductor layer 210. The hole 216 is filled with an electrically conductive material to form the contact hole 204. Then, a second conductive layer 218 is formed on the contact hole 204. The first and the second conductive layers 214 and 218 may be a metal layer. Next, an insulating layer 215 is formed on the second conductive layer 218 and the transparent electrode layer 100 is formed on the insulating layer 215. In an embodiment, the insulating layers 212, 213 and 215 disposed between the semiconductor layer 210, the first conductive layer 214, the second conductive layer 218 and the transparent electrode layer 100 may be silicon nitride, silicon oxide or combinations thereof. The semiconductor layer 210 may be made of amorphous silicon or poly-silicon.

Next, a first polymer layer 110, for example polyimide (PI) is formed on the transparent electrode layer 100. The first polymer layer 110 can be an alignment layer without a rubbing process. The surface of the first polymer layer 110 may not have rubbing imprints and the first polymer layer 110 may have a pretilt angle between 80 degrees and 90 degrees.

A second substrate 108 such as the color filter substrate is disposed opposite to the first substrate 106. The transparent electrode layer 200 is formed on the second substrate 108 and the opening 202 of the transparent electrode layer 200 is arranged to overlap with the storage capacitor 206 and the contact hole 204. Then, a second polymer layer 112 is formed on the transparent electrode layer 200. The material of the second polymer layer 112 can be the same as that of the first polymer layer 110. The second polymer layer 112 can be an alignment layer without a rubbing process and the surface thereof has no rubbing imprints. The second polymer layer 112 may have a pretilt angle between 80 degrees and 90 degrees. Then, a liquid crystal layer 114 is sandwiched between the first substrate 106 and the second substrate 108. In an embodiment, the liquid crystal layer 114 may be formed from a negative-type liquid crystal. In an embodiment, the liquid crystal layer 114 may be a polymer stabilized vertically aligned (PSVA) liquid crystal layer. If no electric field is applied to the display panel, a plurality of liquid crystal molecules in the liquid crystal layer 114 is arranged orthogonal to the first substrate 106 and the second substrate 108. Moreover, the liquid crystal display panel 300 can further include a pair of polarizers (not shown) disposed on the outer sides of the first substrate 106 and the second substrate 108 respectively. The pair of the polarizers may be a linear or a circular polarizer.

Figure 3A:
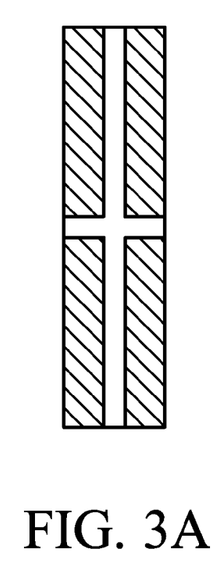
FIGS. 3A-3F show schematic plane views of a transparent electrode layer of a color filter substrate in a sub-pixel of a vertically aligned liquid crystal display (VA-LCD) according to various embodiments of the invention.
Figure 3B:
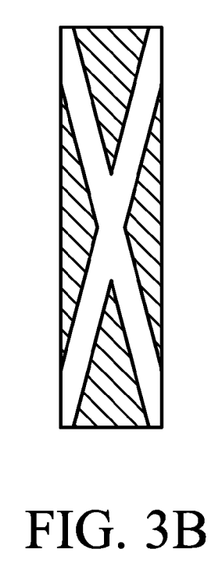
Figure 3C:
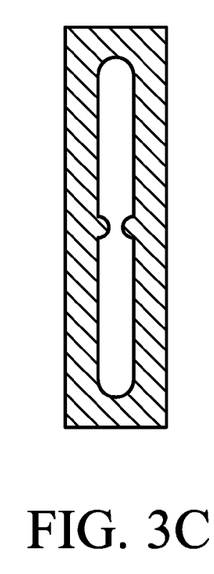
Figure 3D:
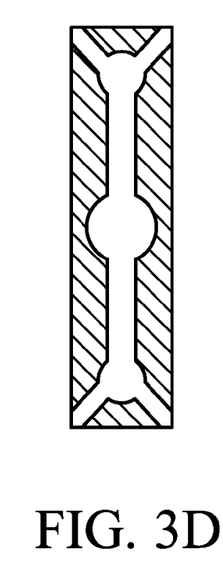
Figure 3E:
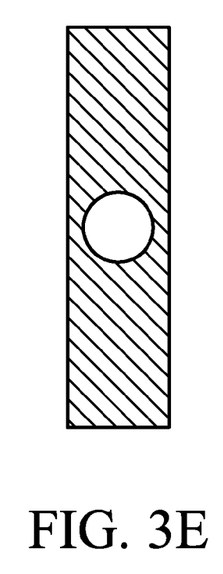
Figure 3F:
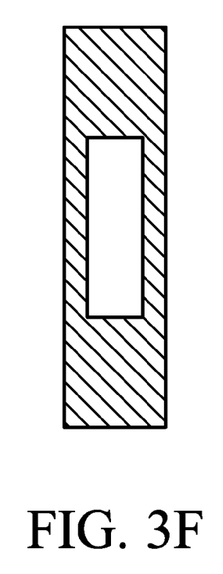

Then, referring to FIGS. 3A-3F, plane views of a transparent electrode layer of a color filter substrate in one sub-pixel of a vertically aligned liquid crystal display (VA-LCD) according to various embodiments of the invention are shown. In addition to the elliptic opening 202 as shown in FIG. 2B, a pattern of the transparent electrode layer of the color filter substrate, for example an opening or a protrusion may have a shape of a crisscross (as shown in FIG. 3A), a X-shaped type (as shown in FIG. 3B), a strip (as shown in FIG. 3C or FIG. 3D), a rectangle (as shown in FIG. 3F), a circle (as shown in FIG. 3E) or the other suitable shapes, which is a continuous pattern in one sub-pixel. Moreover, a size of the opening or the protrusion can be adjusted to satisfy the requirements for the display.

Figure 4:
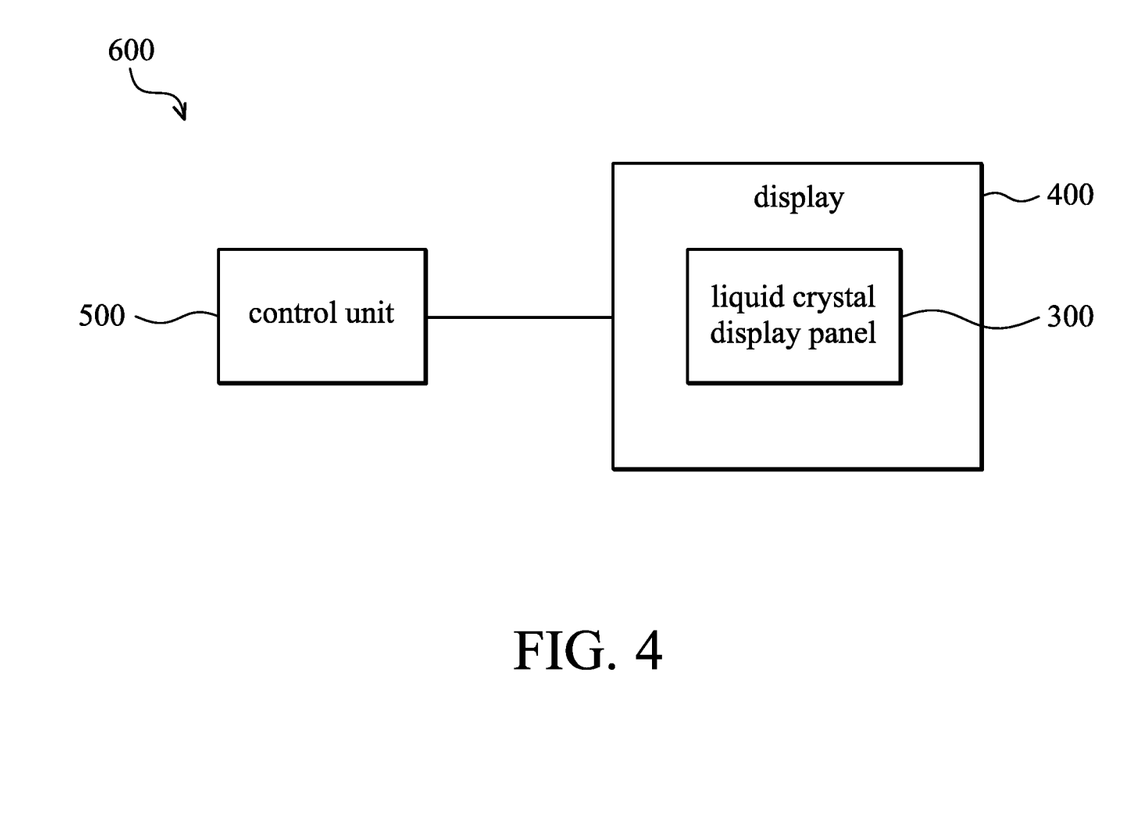
FIG. 4 schematically shows a system for displaying images including the display panel according to an embodiment of the invention.

Then, referring to FIG. 4, a system 600 for displaying images including the display 400 according to an embodiment of the invention is shown. The display 400 including a liquid crystal display panel 300 according to an embodiment of the invention is for example a transmissive liquid crystal display or a transflective liquid crystal display. The display 400 can be a part of an electronic device. In general, the system 600 for displaying images includes the display 400 and a control unit 500. The control unit 500 is coupled with the display 400 to provide input to the display 400, such that the display 400 displays images. The above mentioned electronic device can be a mobile phone, a digital camera, a personal data assistant (PDA), a notebook computer, a desktop computer, a television, a car display or a portable DVD player.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying images, comprising:
    a liquid crystal display panel, comprising:
    a first substrate, having a plurality of orthogonal data lines and scan lines thereon, wherein the two adjacent data lines and the two adjacent scan lines define a sub-pixel;
    a first transparent electrode layer disposed over the first substrate and in the sub-pixel;
    a second substrate disposed opposite to the first substrate, having an inner surface;
    a second transparent electrode layer disposed over the inner surface of the second substrate, corresponding to the sub-pixel, wherein the second transparent electrode layer in the sub-pixel has only one pattern therein;
    a liquid crystal layer disposed between the first substrate and the second substrate, wherein the liquid crystal layer has a plurality of liquid crystal molecules therein and the liquid crystal molecules are orthogonal to the first substrate and the second substrate;
    a semiconductor layer disposed between the first substrate and the first transparent electrode layer;
    a first insulating layer disposed on the semiconductor layer;
    a first conductive layer disposed on the first insulating layer;
    a second insulating layer disposed on the first conductive layer;
    a contact hole disposed in the first insulating layer and the second insulating layer and electrically connecting to the semiconductor layer; and
    a second conductive layer disposed on the contact hole, wherein the semiconductor layer, the first insulating layer and the first conductive layer are combined to form a storage capacitor.

2. The system as claimed in claim 1, wherein the pattern in the second transparent electrode layer is overlapped with the storage capacitor and the contact hole.

3. The system as claimed in claim 2, wherein the liquid crystal display panel further comprises a thin-film transistor, and wherein the pattern in the second transparent electrode layer is overlapped with the thin-film transistor, the storage capacitor and the contact hole.

4. The system as claimed in claim 1, wherein the materials of the first conductive layer and the second conductive layer comprise metal.

5. A system for displaying images, comprising:
    a liquid crystal display panel, comprising:
    a first substrate, having a plurality of orthogonal data lines and scan lines thereon, wherein the two adjacent data lines and the two adjacent scan lines define a sub-pixel;
    a first transparent electrode layer disposed over the first substrate and in the sub-pixel;
    a second substrate disposed opposite to the first substrate, having an inner surface;
    a second transparent electrode layer disposed over the inner surface of the second substrate, corresponding to the sub-pixel, wherein the second transparent electrode layer in the sub-pixel has only one pattern therein;
    a liquid crystal layer disposed between the first substrate and the second substrate, wherein the liquid crystal layer has a plurality of liquid crystal molecules therein and the liquid crystal molecules are orthogonal to the first substrate and the second substrate; and
    a photosensitive spacer and a light shielding layer corresponding to the photosensitive spacer, wherein the photosensitive spacer and the light shielding layer are overlapped with the pattern in the second transparent electrode layer.

\* \* \* \* \*